US008819321B2

(12) United States Patent
Butcher et al.

(10) Patent No.: US 8,819,321 B2
(45) Date of Patent: Aug. 26, 2014

(54) SYSTEMS AND METHODS FOR PROVIDING INSTANT-ON FUNCTIONALITY ON AN EMBEDDED CONTROLLER

(75) Inventors: Wade Butcher, Cedar Park, TX (US); Akkiah Maddukuri, Austin, TX (US); Elie Jreij, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 296 days.

(21) Appl. No.: 12/793,421

(22) Filed: Jun. 3, 2010

(65) Prior Publication Data

US 2011/0302343 A1 Dec. 8, 2011

(51) Int. Cl.
G06F 13/00 (2006.01)
G06F 13/24 (2006.01)
G06F 3/00 (2006.01)
G06F 9/44 (2006.01)

(52) U.S. Cl.
USPC ............... 710/107; 710/2; 710/260; 710/269; 717/127

(58) Field of Classification Search
USPC ............... 710/107, 260, 269; 713/2; 717/127
See application file for complete search history.

(56) References Cited

U.S. PATENT DOCUMENTS

| | | | | |
|---|---|---|---|---|
| 5,630,049 | A * | 5/1997 | Cardoza et al. | 714/25 |
| 6,401,202 | B1 | 6/2002 | Abgrall | |
| 6,727,920 | B1 * | 4/2004 | Vineyard et al. | 715/810 |
| 6,961,941 | B1 | 11/2005 | Nelson et al. | |
| 6,996,706 | B1 * | 2/2006 | Madden et al. | 713/2 |
| 7,234,055 | B2 * | 6/2007 | Chiu et al. | 713/2 |
| 7,281,127 | B2 * | 10/2007 | Rothman et al. | 713/2 |
| 7,434,224 | B2 | 10/2008 | Lescouet et al. | |
| 7,444,449 | B2 * | 10/2008 | Åberg | 710/260 |
| 7,461,247 | B2 * | 12/2008 | van der Veen et al. | 713/2 |
| 7,568,090 | B2 * | 7/2009 | Morrison et al. | 713/2 |
| 7,689,820 | B2 * | 3/2010 | Pierce et al. | 713/2 |
| 7,899,446 | B2 * | 3/2011 | Chen | 455/418 |
| 7,913,017 | B2 * | 3/2011 | Wu et al. | 710/266 |
| 7,991,991 | B2 * | 8/2011 | Kawahara | 713/2 |
| 8,086,836 | B2 * | 12/2011 | Chong et al. | 713/2 |
| 2005/0108511 | A1 * | 5/2005 | Zimmer et al. | 713/1 |
| 2006/0149956 | A1 * | 7/2006 | Chang | 713/1 |
| 2006/0149959 | A1 * | 7/2006 | Rothman et al. | 713/2 |
| 2009/0158097 | A1 * | 6/2009 | Chen et al. | 714/46 |
| 2010/0058046 | A1 * | 3/2010 | John et al. | 713/2 |
| 2010/0281094 | A1 * | 11/2010 | Holt et al. | 709/201 |
| 2011/0016283 | A1 * | 1/2011 | Davis et al. | 711/170 |
| 2011/0055540 | A1 * | 3/2011 | Lin et al. | 713/2 |
| 2011/0161482 | A1 * | 6/2011 | Bonola et al. | 709/223 |

OTHER PUBLICATIONS

Rick Vanover, What You need to know about the Dell DRAC, Jan. 3, 2008.*

* cited by examiner

*Primary Examiner* — Paul R Myers
*Assistant Examiner* — Christopher A Daley
(74) *Attorney, Agent, or Firm* — Baker Botts L.L.P.

(57) ABSTRACT

Systems and methods for providing instant-on functionality on an embedded controller are disclosed. A method of providing instant-on functionality on a controller comprises an initial state, an intermediate state and a final state. The initial state comprises installing a first responder code, enabling the first responder code and enabling a timer interrupt service routine. The intermediate state comprises registering the first responder code as a timer interrupt service routine. The timer interrupt service routine initiates periodic processing. The final state comprises registering a steady-state interrupt service routine.

19 Claims, 2 Drawing Sheets

SYSTEMS AND METHODS FOR PROVIDING INSTANT-ON FUNCTIONALITY ON AN EMBEDDED CONTROLLER

TECHNICAL FIELD

The present disclosure relates generally to information handling systems and, more particularly, to systems and methods for providing instant-on functionality on an embedded controller.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

A common drawback of information handling systems is the amount of time it takes for them to boot or start up. This delay is undesirable for the user. For instance, such delays are important when using an Integrated Dell Remote Access Controller (iDRAC) which is an embedded processor on the server planar available from Dell, Inc., that provides out-of-band management facilities. Out-of-band management involves the use of a dedicated management channel for device maintenance and allows a system administrator to monitor and manage servers and other network equipment by remote control regardless of whether the machine is powered on. Specifically, such remotely controlled interface cards give an administrator the ability to remotely configure an information handling system.

When using a remotely controlled interface card such as the iDRAC, early responses are required by the system for which waiting on the embedded Operating System to start wastes time and causes noticeable penalties to a user. For example, responses to early queries from Basic Input/Output System ("BIOS") over the Keyboard Controller Style ("KCS") bus or other interface such as shared memory or internal network interface could potentially delay the boot-up of the main processor. Additionally, in current systems, the fans that are used for thermal regulation will unnecessarily spin at full speed at first spin, causing noise and suspicious behavior to an observer. Moreover, in a software licensing model, the devices to be licensed such as the Network Interface Card ("NIC") and Redundant Array of Independent Disks ("RAID") hardware must immediately know their licensed state in order to proceed, and iDRAC is the keeper of this data. Therefore, start up delays have many adverse effects on the information handling system.

SUMMARY

The present disclosure relates generally to information handling systems and, more particularly, to systems and methods for providing instant-on functionality on an embedded controller.

In one exemplary embodiment, the present invention is directed to a method of providing instant-on functionality on a controller comprising: an initial state; wherein the initial state comprises: installing a first responder code; enabling the first responder code; and enabling a timer interrupt service routine; an intermediate state; wherein the intermediate state comprises: registering the first responder code as a timer interrupt service routine; wherein the timer interrupt service routine initiates periodic processing; and a final state; wherein the final state comprises registering a steady-state interrupt service routine.

In another exemplary embodiment, the present invention is directed to an information handling system comprising: a power source; and a motherboard powered by the power source; wherein the motherboard comprises: an embedded processor; a memory segment; and a network connection; wherein the memory segment comprises: a first segment comprising: a first responder micro-application; a timer interrupt service routine; and a boot loader; a second segment comprising an interrupt handler; and a third segment comprising: an intelligent platform management interface stack; a web server; and an operating system application.

Thus, the present disclosure provides systems and methods for providing instant-on functionality on an embedded controller. Other technical advantages will be apparent to those of ordinary skill in the art in view of the specification, claims and drawings.

BRIEF DESCRIPTION OF THE DRAWING

A more complete understanding of the present embodiments and advantages thereof may be acquired by referring to the following description taken in conjunction with the accompanying drawing, in which like reference numbers indicate like features.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort would be a routine undertaking for those of ordinary skill in the art having the benefit of the present disclosure.

Figure 1:
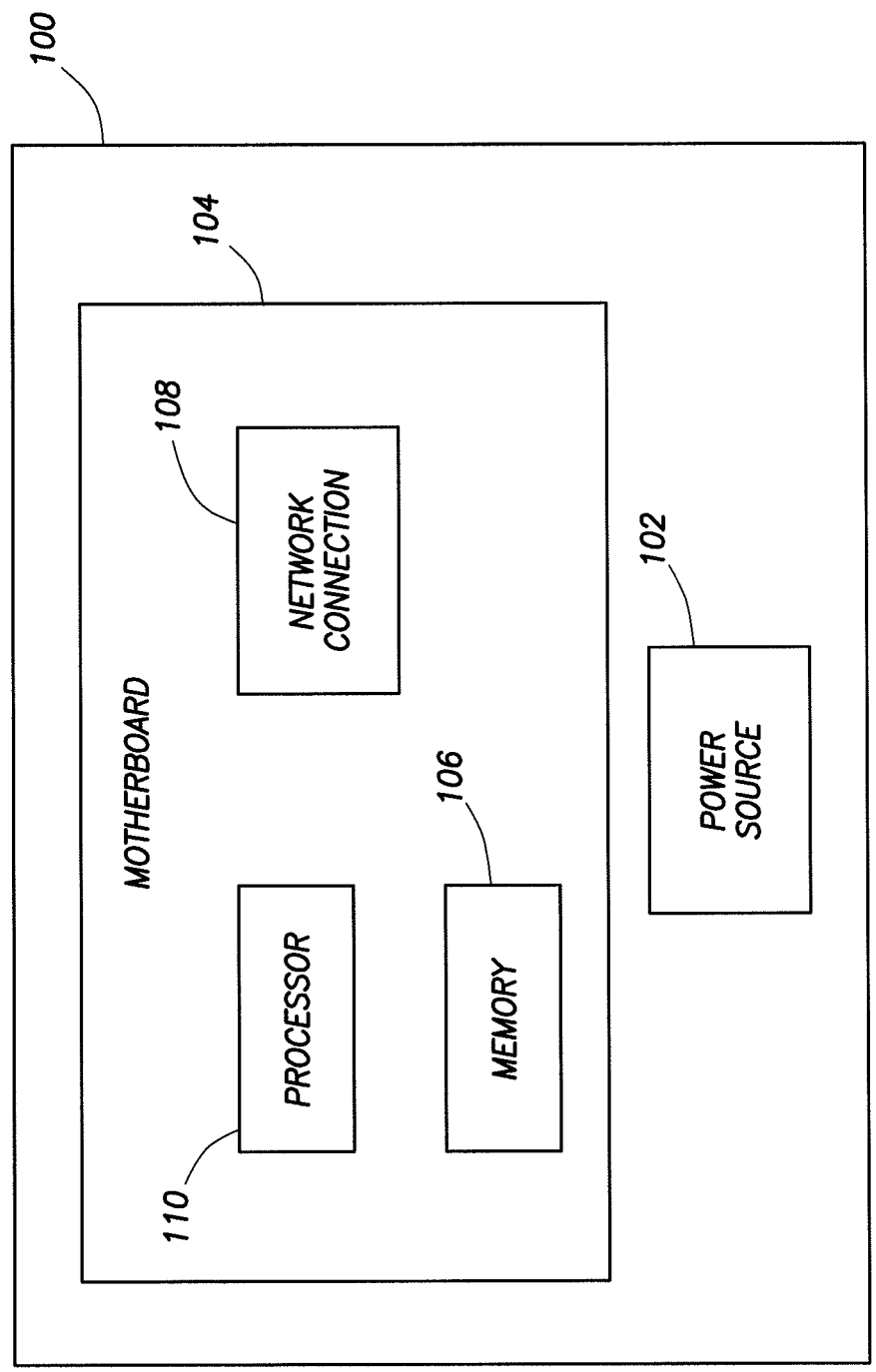
FIG. 1 is an embedded remotely accessed controller on a server planar in accordance with an exemplary embodiment of the present invention.

FIG. 1 depicts an embedded remotely accessed controller on a server planar 100 in accordance with an exemplary embodiment of the present invention. Specifically, the server planar 100 includes a power source 102. The server planar 100 further includes a motherboard 104. The motherboard 104 may include an embedded memory segment 106 and network connections 108. Additionally, a remotely accessed controller may be installed as an embedded processor 110 on the motherboard 104. In one exemplary embodiment, the embedded processor 110 may be an iDRAC. In one embodiment, the iDRAC subsystem 110 may perform the embedded management operations. As would be appreciated by those of ordinary skill in the art, with the benefit of this disclosure, the iDRAC may include power management, virtual media access and remote console capabilities, all of which may be available through a supported web browser. The iDRAC 110 may be powered by the server planar's 100 power supply through the power source 102. As would be appreciated by those of ordinary skill in the art, with the benefit of this disclosure, the iDRAC 110 may continue to draw auxiliary power from the power supply of the server planar 100 through the power source 102 even when the server 100 is turned off.

Figure 2:
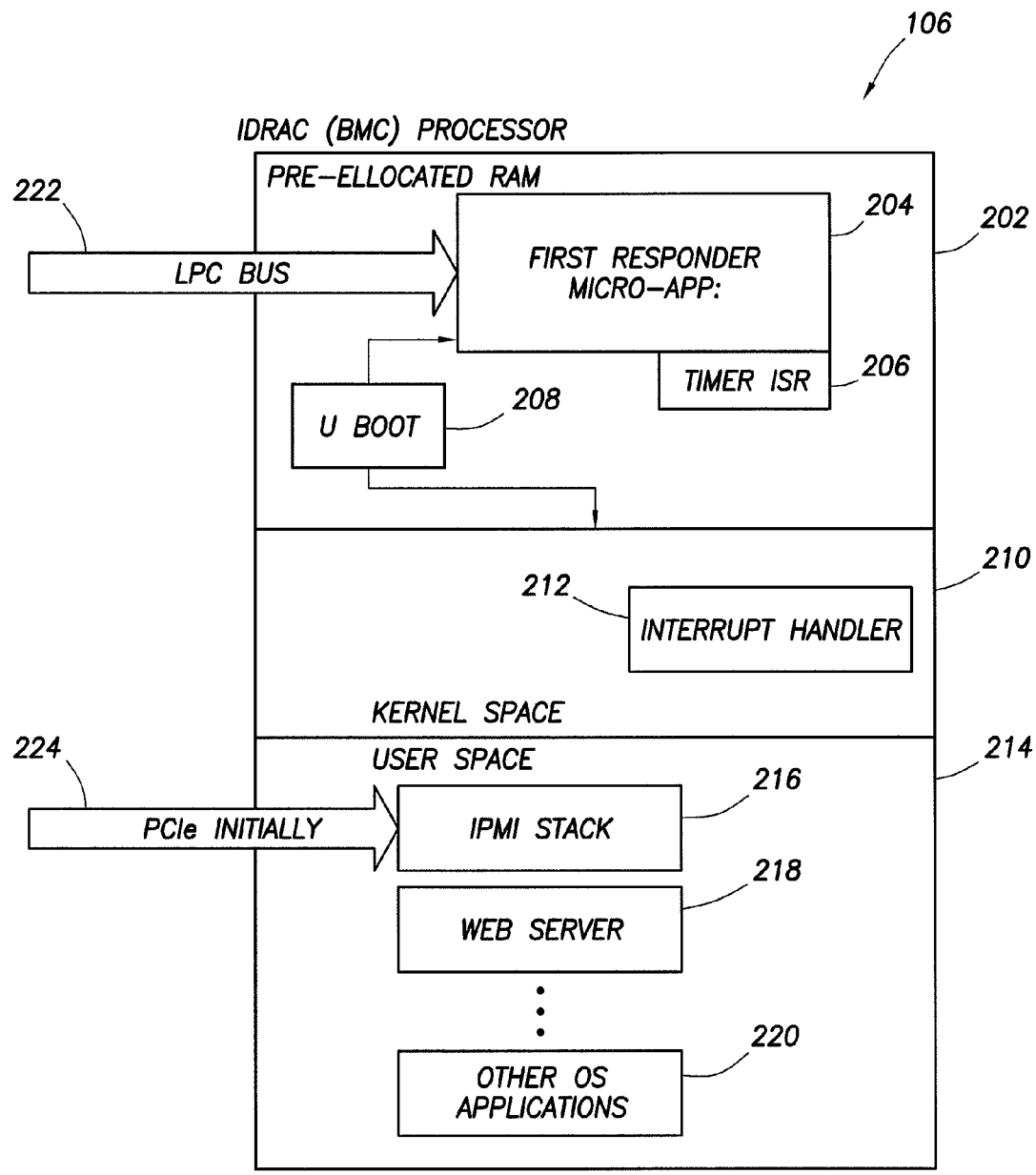
FIG. 2 depicts an embedded processor in accordance with an exemplary embodiment of the present invention.

FIG. 2 depicts the memory 106 associated with an iDRAC 110 in accordance with an exemplary embodiment of the present invention. More specifically, FIG. 2 illustrates a solution that involves a software module that runs outside of any restrictions imposed by the booting Operating System or any initializations that are unrelated to the time critical functions. The memory 106 associated with an iDRAC processor 110 may be provided with three segments. The first segment 202 is a pre-allocated RAM. The first segment 202 may include a first responder micro-application 204, a timer interrupt service routine ("ISR") 206 and a bootloader 208. The first responder micro-application 204 may include the applications necessary for software licensing, thermal control and/or BIOS Baseboard Management Controller ("BMC") responses. As would be appreciated by those of ordinary skill in the art, with the benefit of this disclosure, the first responder micro application 204 may also include other desirable applications.

The second segment 210 is the kernel space RAM which may be used by the Operating System kernel and the Operating System applications and includes an interrupt handler 212. The third segment 214 is the user space which may include an Intelligent Platform Management Interface ("IPMI") stack 216, a web server 218 and other Operating System applications 220. A Low Pin Count ("LPC") bus 222 may be used by the first responder micro-application 204 and provides for an interface with the host processor (not shown). Similarly, a Peripheral Component Interconnect Express (PCIe) 224 may be used by the IPMI stack 216, the web browser 218 and/or other Operating System applications 220 to provide an interface for the host processor (not shown).

In an exemplary embodiment of the present invention, in an initial state, the bootloader 208 from the host processor (not shown) installs and enables a first responder code from the first responder micro-application 204 in the pre-allocated RAM segment 202. The bootloader 208 then enables the timer ISR 206 to call the pre-allocated RAM segment 202 before transition to the Operating System. This pre-allocated RAM segment 202 survives the transition to the Operating System. The first responder code in the pre-allocated RAM segment 202 becomes the initial vector address for handling timer ISRs and fires on a periodic basis while the Operating System is booting. Accordingly, the bootloader 208 installs a small piece of software in RAM that provides critical functions and survives the transition to the Operating System. The bootloader 208 then runs this software on a short interval periodic basis. Additionally, the interrupt control of the iDRAC processor 110 may be manipulated such that the timer interrupts are serviced during the boot-up phase of the Operating System.

Next, in an intermediate state, the Operating System interrupt handler 212 which is located in the kernel space 210 registers the first responder micro-application 204 as a timer ISR and periodic processing occurs when the timer fires. The interrupt control of the processor 110 can be manipulated such that the timer interrupts are serviced during the boot-up phase of the Operating System. When the regular software reaches a ready state, the interrupt vector can be reinitialized to use an ISR that is registered with the regular Operating System interrupt handler.

In a final state, when the Operating System is fully booted, the network interfaces are operational and applications have started running, the kernel registers the steady state ISRs and takes control of the Keyboard Controller Style bus which is an interface typically used between the BMC and the payload processor in the IPMI architecture. In one exemplary embodiment, the Operating System applications may map the first responder micro-application 204 into their address space later to make use of the pre-loaded code.

As would be appreciated by those of ordinary skill in the art, with the benefit of this disclosure, although the present invention is discussed in conjunction with an iDRAC, the methods and systems disclosed herein may be utilized with any interface cards or any embedded processors used for out-of-band management of information handling systems.

Accordingly, the present disclosure provides systems and methods for providing instant-on functionality on an embedded controller. Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A method of providing instant-on functionality on a controller comprising:
    an initial state;
        wherein the initial state comprises:
            installing a first responder code;
            enabling the first responder code; and
            enabling a timer interrupt service routine;
    an intermediate state;
        wherein the intermediate state comprises:
        beginning the booting of an Operating System;
        registering the first responder code as a timer interrupt service routine;
            wherein the timer interrupt service routine initiates periodic processing; and
            wherein the booting of the Operating System occurs concurrently with the periodic processing of the first responder code; and
    a final state;
        wherein the final state comprises registering a steady-state interrupt service routine.

2. The method of claim 1, wherein the first responder code, the timer interrupt service routine and a bootloader are installed in a pre-allocated area of Random Access Memory.

3. The method of claim 2, wherein the pre-allocated area of Random Access Memory survives transition to the Operating System.

4. The method of claim 1, wherein the first responder code becomes an initial vector address for handling timer interrupt service routines.

5. The method of claim 1, further comprising mapping the first responder code in an address space of an Operating System application.

6. The method of claim 1, wherein the Operating System interrupt handler is stored in a pre-allocated area of Random Access Memory.

7. The method of claim 1, wherein the controller is part of a remotely controlled interface card.

8. The method of claim 7, wherein the remotely controlled interface card is an Integrated Remote Access Controller.

9. The method of claim 1, wherein in the final state, the Operating System is fully booted.

10. The method of claim 1, wherein in the intermediate state, an Operating System interrupt handler registers the first responder code as a timer interrupt service routine.

11. The method of claim 1, wherein in the final state, an Operating System registers the steady-state interrupt service routine.

12. The method of claim 1, wherein the controller is an embedded controller.

13. The method of claim 1, wherein in the final state, the Operating System takes control of a Keyboard Controller Style bus.

14. An information handling system comprising:
    a power source; and
    a motherboard powered by the power source;
        wherein the motherboard comprises:
            an embedded processor;
            a memory segment; and
            a network connection;
        wherein the memory segment comprises:
            a first segment comprising:
                a first responder micro-application;
                a timer interrupt service routine for periodically processing the first responder micro-application; and
                a boot loader;
            a second segment comprising an operating system and an interrupt handler for periodically processing the first responder micro-application; and
            a third segment comprising:
                an intelligent platform management interface stack;
                a web server; and
                an operating system application; wherein the booting of the Operating System occurs concurrently with the periodic processing of the first responder micro-application.

15. The information handling system of claim 14, wherein at least one of the first segment and the second segment is a Random Access Memory.

16. The information handling system of claim 14, wherein the first responder micro application interfaces with a host processor.

17. The information handling system of claim 16, wherein the first responder micro application interfaces with the host processor though a low pin count bus.

18. The information handling system of claim 14, wherein the embedded processor is an integrated remote access controller.

19. The information handling system of claim 14, wherein the second segment is a kernel space random access memory.

* * * * *